United States Patent [19]

Woodruff

[11] 3,930,040

[45] Dec. 30, 1975

[54] PROCESS OF STORING OR SHIPPING FRESH MEAT IN A MODIFIED GASEOUS ATMOSPHERE

[75] Inventor: Richard E. Woodruff, Salinas, Calif.

[73] Assignee: TransFRESH Corporation, Salinas, Calif.

[22] Filed: Sept. 16, 1974

[21] Appl. No.: 506,454

[52] U.S. Cl. ............... 426/312; 426/320; 426/418
[51] Int. Cl.² ........................................... A23L 1/31
[58] Field of Search .......... 426/224, 312, 314, 315, 426/317, 320, 371, 382, 418, 316; 21/58

[56] References Cited
UNITED STATES PATENTS 2,490,951  12/1949  Dunkley .......................... 426/314
3,469,947  9/1969  Drury ............................. 21/58 X

*Primary Examiner*—Hyman Lord
*Attorney, Agent, or Firm*—George J. Netter, Esq.

[57] ABSTRACT

Meat and fish can be stored for extended periods under refrigerated conditions without loss of original qualities by maintaining the refrigerated meat in an artificial atmosphere composed of 2½–30% by volume molecular oxygen, 10–75% by volume molecular carbon dioxide, and 1–10% by volume carbon monoxide, and the remainder molecular nitrogen. Alternatively, the carbon monoxide may be removed from the modified atmosphere after the meat has been treated for at least one hour.

5 Claims, No Drawings

3,930,040

PROCESS OF STORING OR SHIPPING FRESH MEAT IN A MODIFIED GASEOUS ATMOSPHERE

BACKGROUND OF THE INVENTION

1. The Field of the Invention

This invention relates generally to the storage, both fixed and movable, of fresh meat, and, more particularly, to such storage and shipment in refrigerated containers containing a preservative modified gaseous environment.

2. Description of the Prior Art

Copending patent application Ser. No. 289,172, REFRIGERATED STORAGE OR SHIPMENT OF FRESH MEAT IN A SYNTHETIC GASEOUS ATMOSPHERE, by James R. Lugg and Ralph L. White, filed Sept. 14, 1972, now U.S. Pat. No. 3,851,080, describes a technique for refrigerated shipping and storing of fresh meat in which the meat is maintained in a modified gaseous atmosphere of carbon dioxide ($CO_2$), about 35–75% by volume; molecular oxygen ($O_2$), about 21–28% by volume; and the remainder essentially molecular nitrogen ($N_2$). Meats of great variety (e.g., beef, pork, veal, lamb, poultry and game) as well as fish, when so treated are found to be capable of refrigerated storage for extended periods of time without development of slime or odor, or without adverse effect on the taste of the meat when cooked.

SUMMARY AND DESCRIPTION OF THE INVENTION

In the practice of the present discovery, meat and fish can be stored under refrigerated conditions for relatively extended periods of time without the development of undesirable slime, unpleasant odor or effect on taste on cooking, and at the same time maintaining the original surface appearance color (bloom) substantially unchanged. All of the above are achieved by maintaining the refrigerated meat in an artificial atmosphere composed of 2½–30% by volume molecular oxygen, 10–75% by volume molecular carbon dioxide, and 1–10% by volume carbon monoxide, and the remainder molecular nitrogen. Alternatively, the carbon monoxide may be removed from the modified atmosphere after the meat has been treated for at least one hour.

Refrigeration, when used in connection with this discovery, is related to establishing the ambient temperature in the range of 29°–40°F., and preferably 30°–33°F.

When the term "meat" is used herein, it is understood to refer to beef, pork, veal, lamb, mutton, poultry and game. Also, it is contemplated that the meat may be in form of carcasses, primals (e.g., quarters), subprimals (e.g., top round), or retail cuts.

DESCRIPTION OF THE WORKING EXAMPLES

EXAMPLE 1: BEEF STORAGE

Several samples of freshly cut steak sized beef were enclosed in hermetically sealed containers provided with 45% by volume molecular carbon dioxide ($CO_2$), 30% by volume molecular oxygen ($O_2$), 2% by volume carbon monoxide (CO), and the remainder molecular nitrogen ($N_2$). The meat in the containers was maintained in the specified artificial atmosphere at a controlled temperature of 33°–34°F. At the end of fourteen days of storage, the container was opening and the beef removed for observation and laboratory analysis.

The beef exhibited a bloom (color) substantially unchanged from that had when originally placed in the container. No offensive odor of any kind was detected, nor was any surface slime present. The sample was then cooked and the appearance and taste were found to be normal. Analysis of the meat surface established a total bacterial count of $1.3 \times 10^5$ per square inch.

In a further container, a sample of freshly cut beef was enclosed in a container having an artificial environmental atmosphere of 50% by volume molecular carbon dioxide, 22% by volume molecular oxygen, 1% by volume carbon monoxide and the remainder molecular nitrogen. On removal after fourteen days at 33°–34°F., the beef was found not to have a putrid odor, but did exhibit moderate brown discoloration. Also, a surface bacterial count of $9.0 \times 10^5$ per square inch was determined.

Another beef sample was placed in a container having an initial atmosphere composed of 50% $CO_2$, 30% $O_2$, 1% CO and the rest nitrogen ($N_2$). During the fourteen (14) day test period under the same refrigerated condition (33°–34°F.), the $CO_2$ content was reduced step-wise to approximately 10%, which is a frequent occurrence in commercial containers (e.g., trailers).

As a first set of controls, beef samples were placed in five (5) containers having a synthetic environmental atmosphere consisting of 10% $CO_2$, 65% $O_2$ and the remainder molecular nitrogen, and refrigerated to 33°–34°F. On removal after fourteen days, the meat showed some browning, but no putrid odor was detected. Bacterial surface count ranged from $9.0 \times 10^4$ to $1.6 \times 10^7$ per square inch.

In a second set of controls, five beef samples were placed in containers having a gaseous environment composed of 55% $CO_2$, 30% $O_2$ and the remainder nitrogen. After fourteen days of storage at 33°–34°F., the samples, on being taken from the containers, showed more brown discoloration than the first set of controls, but the bacterial counts slightly lower. No putrid odor was detected.

A further refrigerated sample of beef was maintained in air and after six days a putrid odor was present. After fourteen days, the meat had suffered extreme discoloration, had a putrid odor and surface slime. Surface bacterial count was high (in the order of $1.0 \times 10^9$ per square inch).

EXAMPLE 2: STORAGE OF CHICKEN HEARTS AND LIVERS

Two containers were provided with a supply of chicken livers and hearts and a modified gaseous environment consisting of 50% $CO_2$, 28% $O_2$, 3% and 5%, respectively, CO, and the remainder nitrogen. When removed from refrigerated storage (33°–34°F.) after fourteen (14) days in this gaseous environment, the hearts and livers were found to have a normal red color. The fatty tissue also remained fresh in appearance, i.e., yellow-orange in color.

A first control container with no CO, included hearts and livers confined in an atmosphere of 50% $CO_2$, 28% $O_2$, and the remainder nitrogen. Within 3–4 days, the liver and hearts had become a decided brown color, and the fatty tissue had turned a dull yellow.

A second control container of hearts and livers was provided with a gaseous environment of 12% $CO_2$, 60% $O_2$ and the remainder nitrogen with no CO present.

Brown discoloration was produced in 5–6 days of refrigerated storage with yellowing of the fatty tissue. Slightly slimy and some off odor after fourteen days.

A further control sample of livers and hearts was refrigerated in air and developed a putrid odor in 6–7 days. Extremely foul smelling and slimy after fourteen days.

EXAMPLE 3: BEEF STORAGE

Several refrigerated (32°F.) sub-primal cuts of beef (e.g., New York strip, bottom round) were contained in an initial artificial atmosphere of 55% $CO_2$, 18% $O_2$, 5% CO, and the remainder nitrogen. At the end of fourteen days, the meat had a bright red color with an overall good appearance.

The meat so stored was cut and found to have an outer red "ring" ranging from ¾ to 1 inch in thickness, which was concluded to be the result of penetration of the CO to that depth. Although the ring was prominent at first, it became less prominent as the darker central portion reddened on exposure to the oxygen in the air.

As a control, similar refrigerated cuts of beef were maintained in an atmosphere without CO composed of 21% $O_2$, 64% $CO_2$ (initially), and the remainder nitrogen. After fourteen (14) days, the meat had decidedly darkened in color.

EXAMPLE 4: BEEF STORAGE

Four (4) roast sized chunks of beef located in separate receptacles were exposed to air including 5% CO for 1, 2, 4 and 24 hours, respectively. The receptacles were then flushed out with a modified atmosphere of 50% $CO_2$, 25% $O_2$ and the remainder nitrogen.

On inspection after fourteen days of storage, the meat had a normal red color and no off odor was detected. Cutting of the meat showed a brown ring (i.e., metmyoglobin formation) under the outer red ring for those samples treated with CO for 1, 2 and 4 hours, but such a brown ring was missing from the 24 hour sample.

Further control samples of beef were refrigerated and stored in air and in an atmosphere consisting of 55% $CO_2$, 25% $O_2$ and the remainder nitrogen. Both of these control samples had developed severe brown discoloration from metmyoglobin formation after fourteen days.

EXAMPLE 5: BEEF STORAGE

Refrigerated steak size portions of beef were held in the following atmospheres for fourteen (14) days with interim inspections being made on the fourth and seventh days:
1. 60% $CO_2$, 25% $O_2$, and the remainder $N_2$.
2. 60% $CO_2$, 25% $O_2$, 5% CO and the remainder $N_2$.
3. 20% $CO_2$, 25% $O_2$ and the remainder $N_2$.
4. 20% $CO_2$, 25% $O_2$, 5% CO and the remainder $N_2$.
5. 20% $O_2$, 5% CO, and the remainder $N_2$.
6. Air.

In atmosphere 1, the beef began to darken after four days and at the end of the fourteen day storage the appearance was very dark. Surface bacterial count was higher than for any of the CO containing atmospheres.

The meat in atmosphere 2 retained a good color throughout the entire fourteen days, although its final color was not as bright as at the four day and seven day inspections. Surface bacteria condition comparable to those obtained in Example 1 and, in fact, slightly improved. Color was markedly improved over atmosphere 1.

The beef samples in atmosphere 3 had darkened somewhat after four days and lost much of their brightness. The darkening continued until at the end of the fourteen days the meat was a very dark brown. Odor was good at the completion of the test with bacterial count higher than that of the samples in atmosphere 1.

Atmosphere 4 provided good color retention as in atmosphere 2 throughout the entire fourteen days, and good odor was similarly maintained. Bacterial surface count of the meat was considerably less than that for the meat contained in atmospheres not including CO, and although acceptable in this regard it was not as good as the samples in atmosphere 2.

The meat in atmosphere 5 maintained good color for the full fourteen days. Bacterial count was comparable to treatments 1 and 2 through 7 days storage, however, the bacteriostatic effect was less than either treatments 1 or 2 after fourteen days, thereby demonstrating the bacteriostatic effect of CO in air.

The control sample in atmosphere 6 (air) had poor color and brightness, and an off odor at the conclusion of the test. Bacterial count was high as compared to those in the other atmospheres.

EXAMPLE 6: CHICKEN STORAGE

Freshly cleaned chickens were stored in air-filled containers and in containers having a modified atmosphere of 40–50% $CO_2$, approximately 20% $O_2$, 5% CO and the remainder $N_2$. The stored chickens were also maintained at a temperature of 32°–33°F., with certain ones removed at 4, 7, 14 and 21 days and examined for shelf-life (i.e., open air at 36°–38°F.).

As a control, fresh chickens immediately subjected to shelf-life conditions were found to retain suitable appearance and good odor for seven (7) days, but not more than eleven (11) days.

On removal of the chickens from the containers on the completion of the four day treatment, all the chickens were found to have a good appearance and odor. The chickens which had been stored in air alone were found to have a shelf life after storage or more than seven (7) days, but less than eleven (11) days. Chickens stored in the prescribed atmosphere were found to have a shelf life or more than 11, but less than 16 days.

Those chickens stored for 7 days were all found to have good appearance and odor. Shelf life of chickens stored in air was found to be greater than 3 days, but less than 6 days. Those stored in the prescribed atmosphere had greater than 11, but less than 14 days of shelf life.

On 14 days of storage, the chickens held in air alone were found to be biologically spoiled and possessed a decided off odor. Those chickens stored in the prescribed atmosphere, on being removed, were found to have a shelf life greater than 3 days, but less than 7 days.

Chickens stored in air alone were extremely spoiled on removal after 21 days of storage, whereas those held in the prescribed modified atmosphere were still good after the same period. Shelf life of those chickens stored in the modified atmosphere for 21 days was found to be greater than 4 days, but less than 7 days.

EXAMPLE 7: PORK STORAGE

Pork loins were cut into five (5) equal pieces and placed in individual drums filled with a modified atmosphere consisting of approximately 45% $CO_2$, 25% $O_2$ and 5% CO, with the remainder $N_2$.

The samples were observed after 1 day, 4, 7, 14, 21 and 28 days of storage. In addition, shelf life (i.e., in air at 38°–40°F.) was tested after storage for 28 days in the prescribed gaseous environment, for 4, 7 and 14 days.

All of the pork samples were in excellent condition throughout the 28 day test. Moreover, after further storage for a total of six (6) weeks, there was only slight loss of color although the meat had a distinct sour smell. After seven (7) weeks of storage, the color loss was probably objectionable and the sour odor was highly objectionable. Even after the seven week storage no slime or putrification was evident.

EXAMPLE 8: BEEF STORAGE

Samples of beef were tested similar to those in Example 7 to determine how long the beef could be kept before spoilage occurred as a result of either discoloration or high bacterial count. Conversely, it was desired to determine whether or not CO would enhance the meat color in such manner as to mask the fact that the meat was actually spoiled.

The modified atmosphere in which the beef samples were stored was composed of 40–50% $CO_2$, approximately 20% $O_2$, and initially 5% CO, which was flushed out after 48 hours.

The beef was examined after 4, 7, 14, 21 and 28 days of storage. Through 14 days the color was excellent until after 21 days of storage significant discoloration had taken place, and after 28 days it was completely discolored.

At the completion of 28 days storage, the beef had developed a sour odor rather than a putrid odor.

EXAMPLE 9: LAMB STORAGE

A primary purpose of this test was to determine how long cuts of lamb could be maintained in a preservative atmosphere according to the present discovery without becoming spoiled. In addition, it was desired to determine if such treatment would mask true spoilage of the meat, making it appear good when in fact it was not.

Receptacles including the cuts of lamb were charged with a modified atmosphere consisting of 40–50% $CO_2$, 20% $O_2$ and initially 9% CO.

After 21 days of storage, the color was good, although slightly darker than when test was initiated. Odor was good and the surface bacteria count was acceptable, i.e., less than $1 \times 10^6$ per square inch. The maximum shelf life after 21 days was 4 days.

It is concluded that in the practice of the present discovery, meats of great variety and fish can be stored for extended periods of time both in fixed locations and in mobile storage containers, while maintaining the original qualities of of the meat. The containers within which storage is accomplished are provided with a modified atmosphere containing significant amounts of molecular oxygen (2½–30%), elevated amounts of carbon dioxide (at least 10%), and 1–10% carbon monoxide, with the remainder molecular nitrogen. The carbon monoxide may be optionally retained in the modified atmosphere, or purged therefrom after an initial period of at least one hour. Not only does the described process maintain original qualities of appearance, but in the test periods covered in various examples, when the meat was truly spoiled, as evidenced, for example, by a bacteria count exceeding $1 \times 10^6$ per square inch, the appearance also indicated spoilage, i.e., no masking of truly spoiled meat occurred.

The process and modified atmosphere described herein is not only beneficial in preserving original qualities of meat, but also produces salutary effects on fish, both in appearance and retarding spoilage.

I claim:

1. In the process of storage or shipment of fresh meat refrigerated to a temperature in the range of 29°–40° F., the improvement which consists essentially of maintaining said meat in a modified gaseous atmosphere of carbon dioxide, about 10–75% by volume, molecular oxygen, about 2½–30% by volume; carbon monoxide, about 1–10% by volume; and the remainder essentially molecular nitrogen during the period of storage or shipment.

2. The process of claim 1, wherein said refrigeration temperature is about 32° – 34° F.

3. In the process of storage or shipment of fresh meat refrigerated to a temperature in the range of 29°–40° F., the improvement which consists essentially of:

maintaining said meat in a modified gaseous atmosphere of about 10–75% by volume of molecular carbon dioxide, about 2½–30% by volume of molecular oxygen, about 1–10% by volume of carbon monoxide, and the remainder essentially molecular nitrogen; and purging the modified gaseous atmosphere of the carbon monoxide after at least one hour by flushing with a further modified atmosphere of 50% carbon dioxide, 25% oxygen, and the remainder nitrogen.

4. The process of claim 3, in which said refrigeration temperature is about 32°–34° F.

5. In the process of storage or shipment of meat maintained at a temperature in the range of 29°–40° F., the improvement which consists essentially of, in the order stated:

exposing said meat to a first modified atmosphere of about 1–10% by volume of carbon monoxide and the remainder air; and after at least one hour flushing with and maintaining said meat in a second modified gaseous atmosphere of about 10–75% by volume of molecular carbon dioxide, about 2½–30% by volume of molecular oxygen, and the remainder essentially nitrogen.

* * * * *